United States Patent [19]

Jarre et al.

[11] 4,251,639

[45] Feb. 17, 1981

[54] MANUFACTURE OF FLEXIBLE FOAMS

[75] Inventors: Wolfgang Jarre, Ludwigshafen; Herbert Stutz, Karlsruhe; Ernst Schoen, Diepholz, all of Fed. Rep. of Germany

[73] Assignee: BASF Aktiengesellschaft, Ludwigshafen, Fed. Rep. of Germany

[21] Appl. No.: 28,313

[22] Filed: Apr. 9, 1979

[30] Foreign Application Priority Data

Apr. 11, 1978 [DE] Fed. Rep. of Germany ....... 2815579

[51] Int. Cl.³ .............................................. C08G 18/14
[52] U.S. Cl. .................................................. 521/159
[58] Field of Search ................................ 521/159, 160

[56] References Cited

FOREIGN PATENT DOCUMENTS 874430 8/1958 United Kingdom .

*Primary Examiner*—Maurice J. Welsh
*Attorney, Agent, or Firm*—Norbert M. Lisicki

[57] ABSTRACT

This invention concerns a process for the manufacture of flexible polyurethane foams from urethane-modified aromatic polyisocyanates having an NCO content of 15 to 30 percent by weight and a viscosity of 100 to 2000 centipoises at 20° C., which are obtained by reaction of a mixture of diphenylmethane diisocyanates and polyphenylene polymethylene polyisocyanates containing 55 to 85 percent by weight of diphenylmethane diisocyanate based on the total weight of the polyisocyanate mixture and a hydroxyl compound with 2 to 4 Zerewitinoff active hydrogen atoms and a molecular weight of 60 to 1500, in an equivalency ratio of NCO groups to active hydrogen atoms of the hydroxyl compound of 2:1 to 60:1, polyols, catalysts, blowing agents, and optionally, chain extenders, auxiliaries, and additives.

8 Claims, No Drawings

MANUFACTURE OF FLEXIBLE FOAMS

BACKGROUND OF THE INVENTION

1. Field of the Invention

The invention concerns a process for the manufacture of flexible polyurethane foams in which there is used as organic polyisocyanate a urethane-modified mixture of di-phenylmethane diisocyanates and polyphenyl polymethylene polyisocyanates with a content of 55 to 85 percent by weight of diphenylmethane diisocyanate, an NCO content of 15 to 30 percent by weight, and a viscosity of 100 to 2000 centipoises at 20° C.

2. Description of the Prior Art

The manufacture of flexible polyurethane foams is known. Toluene diisocyanates or the commercially available mixtures of 2,4- and 2,6-toluene diisocyanates are usually used as polyisocyanates. A disadvantage of this is that toluene diisocyanates, due to their high vapor pressure, are relatively strongly toxic and therefore, special precautionary measures must be taken and observed during their processing.

In order to reduce the toxicity hazard and increase the reactivity, it has been suggested to replace the toluene diisocyanates by mixtures of toluene diisocyanates and a mixture of homologous polyaryl polyalkylene polyisocyanates for the manufacture of polyurethane plastics including foams.

Although mixtures of diphenylmethane diisocyanates and polyphenylene polymethylene polyisocyanates are less hazardous due to the markedly lower vapor pressure, the use of these polyisocyanate mixtures as the sole isocyanate for the manufacture of flexible polyurethane foams has not caught on in industry. The primary reason for this is the insufficient mechanical-property level, particularly, the very low breaking elongation of such polyurethane foams. This is all the more surprising, since mixtures of diphenylmethane diisocyanates and polyphenylene polymethylene polyisocyanates as polyisocyanate components for the manufacture of other polyurethane-foam types, such as rigid foams, rigid integral-skin foams, and flexible integral-skin foams, have found wide-spread application.

According to data in British Pat. No. 874,430, flexible polyurethane foams are manufactured by reaction of polyether polyols having at least two hydroxyl groups and a polyisocyanate mixture consisting of diarylmethane diisocyanates containing 5 to 50 percent by weight of a polyisocyanate having a functionality greater than 2 in the presence of water. Drawbacks of the described process are the poor processability of the foamable polyurethane mixtures, which tend to collapse during foaming and the insufficient mechanical properties of the foams produced.

SUMMARY OF THE INVENTION

This invention concerns a process for the manufacture of flexible polyurethane foams from urethane-modified aromatic polyisocyanates having NCO contents of 15 to 30 percent by weight and a viscosity of 100 to 2000 centipoises at 20° C., which are obtained by reaction of a mixture of diphenylmethane diisocyanates and polyphenylene polymethylene polyisocyanates containing 55 to 85 percent by weight of diphenylmethane diisocyanate based on the total weight of the polyisocyanate mixture and a hydroxyl compound with 2 to 4 Zerewitinoff active hydrogen atoms and a molecular weight of 60 to 1500, in an equivalency ratio of NCO groups to active hydrogen atoms of the hydroxyl compound of 2:1 to 60:1, polyols, catalysts, blowing agents, and optionally, chain extenders, auxiliaries, and additives.

DESCRIPTION OF THE PREFERRED EMBODIMENTS

The purpose of this invention was to manufacture, without problems, flexible polyurethene forms having good mechanical properties based on non-toxic polyisocyanates or at least those of low toxicity.

The problem was solved by a process for the manufacture of flexible polyurethane foams from organic polyisocyanates, polyols, catalysts, foaming agents, and possibly chain extenders as well as auxiliaries and additives, which is characterized by the fact that there are used as organic polyisocyanates urethane-modified aromatic polyisocyanates with NCO contents of 15 to 30 percent by weight and a viscosity of 100 to 2000 centipoises at 20° C. which are obtained by reaction of a mixture of diphenylmethane diisocyanates and polyphenylene polymethylene polyisocyanates containing 55 to 85 percent by weight of diphenylmethane diisocyanate and a hydroxyl compound having 2 to 4 Zerewitinoff active hydrogen atoms and a molecular weight of 60 to 1500 in an equivalency ratio of NCO group to active hydrogen atoms of the hydroxyl compound of 2:1 to 60:1.

Surprisingly, it was determined that by the selection of the urethane-modified polyisocyanate mixture to be used in accordance with this invention, in combination with the commonly used polyols and as blowing agents, water or mixtures of water and low-boiling, possibly halogenated hydrocarbons or dimethyl ether, flexible polyurethane foams having excellent mechanical properties are obtained.

An important feature of the process according to this invention is the use of an aromatic urethane-modified polyisocyanate mixture as polyisocyanate component, which is produced by reaction of a mixture of diphenylmethane diisocyanates and polyphenylene polymethylene polyisocyanates containing 55 to 85 percent by weight, preferably 60 to 70 percent by weight, of diphenylmethane diisocyanate and a hydroxyl compound with 2 to 4, preferably 2, Zerewitinoff active-hydrogen atoms, and a molecular weight of 60 to 1500, preferably 120 to 1000, in an equivalency ratio of NCO group to active-hydrogen of the hydroxyl compound of 2:1 to 60:1, preferably 5:1 to 50:1.

The mixture of diphenylmethane diisocyanates and polyphenylene polymethylene polyisocyanates with the above-mentioned content of diphenylmethane diisocyanate can, for instance, be manufactured in accordance with the data in German Published Application No. 24 25 658. The quantity ratios of the isomeric 4,4'-, 2,4'- and 2,2'-diphenylmethane diisocyanates to one another in the mixture is not of primary importance. According to the invention, it is primarily important that the total content of diphenylmethane diisocyanate in the mixture corresponds with the above-mentioned concentration conditions. Preferably, however, there are used those mixtures which contain less than 10 percent by weight and, in particular, less than 3 percent by weight, of 2,4'-diphenylmethane diisocyanate based on the total weight of diphenylmethane diisocyanate.

Suitable hydroxyl compounds with 2 to 4 Zerewitinoff active hydrogen atoms and molecular weights of 50 to 1500 include, for instance, alkanolamines such as mono-, di- and triethanolamine; mono-, di and tri-isopropanolamine; nitrogen-atom-containing alkoxylation products with molecular weights of 100 to 1500, preferably of 100 to 500, produced by alkoxylation of di- to tetrafunctional NH-group-containing starting molecules, such as possibly N-mono- and N,N'-dialkyl substituted diamines with 1 to 4 carbon atoms in the alkyl radical, and 2 to 12, preferably, 2 to 6, carbon atoms in the alkylene group, such as ethylene diamine, 1,4-butanediamine, and 1,6-hexanediamine, and possibly N-mono- and N,N'-dialkyl-substituted hydrazines with 1 to 4 carbon atoms in the alkyl radical, such as hydrazine, N,N'-dimethyl hydrazine and N,N'-dibutyl hydrazine, with alkylene oxides such as ethylene oxide and propylene oxide or their mixtures, and di- to tetrafunctional alcohols, such as ethylene glycol, glycerine, trimethylolpropane and pentaerythritol. Preferably used, however, are difunctional alcohols such as propylene glycol, dipropylene glycol, tripropylene glycol, and oligomeric polypropylene glycols with molecular weights of up to 1500, as well as neopentyl glycol.

The aromatic urethane-modified polyisocyanate mixtures to be used according to this invention have NCO contents of 15 to 30 percent by weight, preferably of 25 to 30 percent by weight, and viscosities of 100 to 2000 centipoises at 20° C., preferably 120 to 1500 centipoises at 20° C.

For the manufacture of flexible polyurethane foams in accordance with the process of this invention, preferably polyester polyols and, in particular, polyester polyols, are taken into consideration as polyols. However, other hydroxyl group-containing polymers having molecular weights of 400 to 7500, such as polycarbonates, in particular, those manufactured by the transesterification of diphenyl carbonate with 1,6-hexanediol, polyoxymethylene glycols and polyester amides, may also be used.

Suitable polyester polyols may, for instance, be produced from dicarboxylic acids, preferably aliphatic dicarboxylic acids, having 2 to 12 carbon atoms in the alkylene radical, and multifunctional alcohols, preferably diols.

These acids include, for instance, aliphatic dicarboxylic acids such as glutaric acid, pimelic acid, suberic acid, azelaic acid, sebacic acid, undecanedioic acid, dodecanedioic acid, and preferably, succinic and adipic acids; cycloaliphatic dicarboxylic acids such as 1,3- and 1,4-cyclohexane dicarboxylic acid; and aromatic dicarboxylic acids such as phthalic acid and terephthalic acid. Examples of di- and multifunctional, particularly difunctional, alcohols are: ethylene glycol, diethylene glycol, propylene glycol, dipropylene glycol, 1,3-propanediol, 1,10-decanediol, glycerine, trimethylolpropane, and preferably, 1,4-butanediol, and 1,6-hexanediol. If trifunctional alcohols are used for the manufacture of the polyester polyols, their amount must be chosen in such a manner that the functionality is a maximum of 2.8, preferably 2 to 2.3.

Particularly well proven and, therefore, used on a preferred basis, are those polyester polyols which are produced by polycondensation of a dicarboxylic acid mixture which, based on the total weight of the named dicarboxylic acids, contains the following: 20 to 35 percent by weight, preferably 28 to 33 percent by weight, of succinic acid; 35 to 50 percent by weight, preferably 40 to 45 percent by weight, of glutaric acid; and 20 to 32 percent by weight, preferably 24 to 28 percent by weight, of adipic acid; and alcohol mixtures of ethylene glycol/diethylene glycol, ethylene glycol/trimethylolpropane and diethylene glycol/trimethylolpropane. In addition to the named dicarboxylic acids, the dicarboxylic acid mixture may contain up to 5 percent by weight, preferably up to 2 to 3 percent by weight, based on the total weight, of impurities, which consist of primarily imides of the succinic and glutaric acids. Dicarboxylic acid mixture of the named type may, for instance, be obtained as by-products during the manufacture of adipic acid by oxidation of cyclohexanol or cyclohexanone with nitric acid. The polyester polyols which have molecular weights of 500 to 5000, preferably 1500 to 3000, and functionalities of 2 to 3.5, preferably 2 to 2.3, can be used as such or in the form of mixtures in accordance with this invention.

However, polyether polyols with molecular weights of 400 to 7500, preferably 2000 to 5000, and functionalities of 2 to 3, preferably 2 to 2.3, are particularly well suited as polyols. The preferably basically linear polyether polyols are manufactured according to familiar methods from one or more cyclic ethers, preferably alkylene oxides with 2 to 4 carbon atoms in the alkylene radical, and a starter molecule which contains 2 to 3, preferably 2, active bonded hydrogen atoms. Suitable cyclic ethers include 1,2- or 2,3-butylene oxide, styrene oxide, and preferably, ethylene oxide and 1,2-propylene oxide. The alkylene oxides may be used individually, alternatingly in sequence, or as mixtures. Possible starter molecules include: water, dicarboxylic acids such as succinic acid, adipic acid, phthalic acid, and terephthalic acid, N,N'-dialkyl substituted diamines with 1 to 4 carbon atoms in the alkyl radical based on, for instance, ethylene diamine, 1,2- or 1,3-propanediamine, 1,4-butanediamine, 1,6-hexanediamine, 4,4'-, 2,4'- and 2,2'-diaminodiphenylmethane as well as N-alkyldiethanolamine, and preferably, multifunctional, particularly bifunctional, alcohols such as ethylene glycol, 1,2- or 1,3-propanediol, diethylene glycol, dipropylene glycol, 1,4-butanediol, 1,6-hexanediol, glycerine, and trimethylolpropene. Comparable products prepared from tetrahydrofuran and oxetane can also be employed.

The polyether polyols can be used as such or in form of mixtures.

Instead of the polyester polyols or polyether polyols, mixtures of polyester polyols and polyether polyols may also be used. Depending upon the purpose of the flexible foam to be manufactured, the ratio of the components can vary within wide limits, for instance, in weight ratios of polyester polyol to polyether polyol of 80:20 to 5:95.

It may be advantageous to use chain extenders for the manufacture of the flexible polyurethane foams in addition to the above-mentioned polyols. Particularly, difunctional compounds with molecular weights of 18 to less than 300, come into consideration as chain extenders. Preferably there are used aliphatic diols with 2 to 6 carbon atoms, such as ethylene glycol, 1,4-butanediol, and 1,6-hexanediol, and aromatic aliphatic diols, such as the bis-(2-hydroxyethyl) ether of hydroquinone.

Another feature of the process according to this invention is the use of water, which reacts with the isocyanate mixture and provides carbon dioxide as the blowing agent. Preferably used are 2 to 6 percent by weight, in particular 2.5 to 3.5 percent by weight, of water, relative to the weight of the polyol. Instead of water alone, mixtures of water and chemically inert, low-boiling, possibly halogenated hydrocarbons or ethers can be used as blowing agents. Examples of substances which may possibly be used are optionally halogenated hydrocarbons having boiling points below 50° C., preferably between −50° and 30° C., under atmospheric pressure. To be mentioned in detail are halogenated hydrocarbons, such as monochlorodifluoromethane, dichloromonofluoromethane, dichlorodifluoromethane and trichlorofluoromethane and their mixtures, and hydrocarbons, such as propane and isobutane, as well as dimethyl ether.

Suitable mixtures of water and possibly halogenated hydrocarbons generally consist of 5 to 70 percent by weight, preferably 10 to 15 percent by weight, of water, and 30 to 95 percent by weight, preferably 50 to 90 percent by weight, of possibly halogenated hydrocarbons, with the percentages by weight being based on the total weight of the blowing agent mixture. The required quantities of blowing-agent mixtures can be determined by simple experimentation as a function of the mixing ratio of water to possibly halogenated blowing agents as well as of the desired foam density, and are approximately 2 to 40, preferably 5 to 25, percent by weight, based on the polyol weight.

Catalysts which accelerate the polyurethane formation and, optionally, auxiliaries and additives which are commonly used for the manufacture of flexible polyurethane foam, can also be added to the formable reaction mixture. These include, for instance, surface-active materials, flame inhibitors, pore regulators, antioxidants, hydrolysis-protection agents, dyes, fillers and other additives.

Suitable catalysts for accelerating the reaction between the polyols, the water, and optional chain-extension agents, on the one hand and the urethane-modified polyisocyanate mixture according to this invention, on the other hand, include tertiary amines such as dimethylbenzylamine, N,N,N',N'-tetramethyldiaminodiethyl ether, bis-(dimethylaminopropyl)-urea, N-methyl- or N-ethylmorpholine, dimethylpiperazine, 1,2-dimethylimidazole, 1-aza-bicyclo-(3,3,0)-octane, and preferably, triethylenediamine; metal salts such as lead octoate, tin di-2-ethylhexanoate, and preferably, tin-(II) salts, and dibutyltin dilaurate, as well as, particularly, mixtures of tertiary amines and organic tin salts.

Preferably used are 0.5 to 5 percent by weight catalyst based on tertiary amines and/or 0.01 to 2.5 percent by weight of metal salts, based on the polyol weight.

Other possible materials to be used include surface-active substances which support the homogenization of the raw materials and which are also possibly suited to regulate the cell structure of the flexible polyurethane foams. To be mentioned as examples are siloxane-oxyalkylene mixed polymers and other organic polysiloxanes, oxyethylated alkylphenol, oxyethylated fatty alcohols, paraffin oils, castor oil or ricinoleic ester, and turkey red oil, which are used in quantities of 0.2 to 6 parts by weight per 100 parts by weight of the urethane-modified polyisocyanate mixture.

In order to improve the flame resistance, flame inhibitors may be added to the flexible polyurethane foams manufactured in accordance with this invention. To be mentioned as examples are compounds containing phosphorus and/or halogen atoms which furthermore can reduce the tendency toward brittleness of the products and function as plasticizers. These include tricresyl phosphate, tris-2-chloroethyl phosphate, tris-chloropropyl phosphate, and tris-2,3-dibromopropyl phosphate; inorganic flame inhibitors such as antimony trioxide, arsenic oxide, ammonium phosphate, ammonium sulfate, and others; and preferably, cyanic acid derivatives such as cyanamide, dicyandiamide, guanidine, and in particular, guanidine salts, biguanidine, and particularly, melamine. Cyanic acid derivatives of the referenced type are described, for instance in copending U.S. patent application Ser. No. 28,663 filed Apr. 10, 1979, pending. It has generally proven to be advantageous to use 5 to 70 parts by weight, preferably 10 to 50 parts by weight, of the above-referenced flame inhibitors per 100 parts by weight of the urethane-modified polyisocyanate mixture.

More detailed data concerning the above-mentioned other commonly used auxiliaries and additives are described in the literature, such as the monograph by J. H. Saunders and K. C. Frisch, "High Polymers" Volume XVI, Polyurethanes, Parts 1 and 2, Interscience Publishers, 1962 and 1964.

The flexible polyurethane foams may be produced according to the prepolymer process and preferably, according to the one-shot process.

If the flexible polyurethane foams are produced according to the one-shot process, a mixture of polyol, water, catalyst, and possibly chain extenders, auxiliaries and additives, is usually brought to reaction with the urethane-modified polyisocyanate mixture to be used according to this invention at temperatures of 15° to 60° C., preferably 25° to 40° C., in such quantities that the ratio of hydroxyl groups of the polyols and optional, chain extenders to the NCO groups of the urethane-modified polyisocyanates is 0.1:1 to 0.4:1, preferably 0.15:1 to 0.3:1, and that the ratio of all Zerewitinoff active-hydrogen atoms—bonded to polyol, optional chain extenders, and water—to the NCO group of the urethane-modified polyisocyanate mixture is approximately 0.7 to 1.3:1, preferably 0.9 to 1.1:1. When using a mixing chamber with several feed nozzles, the liquid raw material can be introduced individually, or if the components are solid, in form of solutions or suspensions, and can be mixed intensively in the mixing chamber. However, it has proven to be particularly appropriate to work according to the two-component method and to combine the mixture of polyol, water, catalyst, optional chain extenders, auxiliaries and additives, as component A and to use the polyisocyanate mixture as component B.

In order to manufacture the NCO-group-containing prepolymers for the prepolymer polyurethane process, the urethane-modified polyisocyanate mixture to be used in accordance with the invention is reacted with the above-mentioned polyols and/or chain extenders in such quantities that the ratio of NCO groups to total hydroxyl is 1.8:1 to 55:1, preferably 4:1 to 45:1. The resulting prepolymers are subsequently mixed with water or mixtures consisting of water and low-boiling, possibly halogenated hydrocarbons and possibly additional polyols and/or chain extenders and auxiliaries and additives, and are allowed to foam.

The flexible polyurethane foams are initiated at elevated temperatures, such as temperatures between 15° and 60° C., preferably between 35° to 45° C. A post-heating process is generally not required.

The flexible polyurethane foams produced in accordance with this invention have densities of approximately 20 to 150 grams per liter and excel particularly because of their high load-bearing capacity, tear strength, and tensile strength.

The products are particularly well suited for the manufacture of upholstered furniture, automobile seats, head supports, molded pieces, and foam backing of foils.

The parts referred to in the examples are parts by weight.

EXAMPLE 1

Manufacture of Urethane-Modified Polyisocyanate Mixtures

To 95 parts of a mixture of diphenylmethane diisocyanates and polyphenylene polymethylene polyisocyanates containing approximately 65 percent by weight of diphenylmethane diisocyanate, and approximately 10 percent by weight of three functional isocyanates, 5 parts of oligomeric propylene glycols with an average molecular weight of 250 are added at room temperature and, while the mixture is agitated, the mixture is heated at 80° C. for 2 hours and is subsequently cooled. A urethane-modified polyisocyanate mixture with an NCO content of 28.6 percent by weight and a viscosity of 140 centipoises at 23° C. is obtained.

Proceeding in accordance with the method given in Example 1, but using the raw materials and quantities summerized in Table I, the urethane-modified polyisocyanate mixtures listed in that table are obtained.

The following abbreviations were used in Table I:
Crude MDI: Mixture of diphenylmethane diisocyanates and polyphenylene polymethylene polyisocyanates
Pure MDI: 4,4'-diphenylmethane diisocyanate 99.9 percent purity
Mixture: Mixture obtained from crude MDI and pure MDI
C$_6$-diol: Mixture of isomeric diols with 6 carbon atoms having an average molecular weight of approximately 118
PP-10: Polypropylene glycol having an average molecular weight of 1000
PP-4: Polypropylene glycol having an average molecular weight of 400

Manufacture of Polyurethane Foams

Component A

For Examples 2 to 3 and Comparison Examples I to V, the same mixture was used as Component A. The mixture consisted of:
100 parts of a polyether polyol based on dipropylene glycol-propylene oxide-ethylene oxide with an OH number of 29,
3.2 parts of water,
0.1 part of amine catalyst (commercial product Desmorapid ® PV by Bayer AG, Leverkusen),
0.17 part bis(beta-N,N-dimethylaminoethyl)-ether,
0.17 part of triethylenediamine, and
1.4 parts of a foam stabilizer based on polysiloxane-polyoxyalkylene (commercial product Tegostab ®B 4690 by Goldschmitt AG, Essen).

EXAMPLE 6

To 105 parts of Component A are intensively mixed 61.3 parts of the polyisocyanate mixture according to Example 1 at 25° C. Subsequently, the mixture is allowed to foam.

The foamable polyurethane mixture displays normal foaming behavior (cream time 15 seconds; rise time 85 seconds). The mechanical properties of the resulting foam have been summarized in Table II.

EXAMPLE 7

To 105 parts of Component A are intensively mixed 69.8 parts of the polyisocyanate mixture in accordance with Example 2 at 35° C. and are subsequently allowed to foam at a mold temperature of 55° C.

The cream time is 12 seconds; the rise time is 70 seconds. The mechanical properties of the well processable foams are summarized in Table II.

EXAMPLE 8

A mixture of
630 parts of a polyether polyol based on dipropylene glycol, propylene oxide, ethylene oxide with an OH number of 29,

TABLE I

| Polyisocyanate Mixture Example | Diphenylmethane diisocyanate and Polyphenyl Polymethylene Polyisocyanate | | Oligomer Content | Hydroxyl Compounds | | Urethane-Modified Polyisocyanate Mixtures | |
|---|---|---|---|---|---|---|---|
| | Type | Quantity (Parts) | Type (% by Wt.) | Type | Quantity (Parts) | NCO-Group (% by Wt.) | Viscosity (cps 23° C.) |
| 2 | Crude MDI | 67.8 | difunctional ~41 trifunctional ~23 | | | | |
| | Pure MDI | 32.2 | | | | | |
| | Mixture | | difunctional ~60 trifunctional ~16 | C$_6$-diol | 5.25 | 26.8 | 1400 |
| 3 | Crude MDI | 59.3 | | | | | |
| | Pure MDI | 40.7 | | | | | |
| | Mixture | | difunctional ~65 | Dipropylene glycol | 3.67 | 28.3 | 370 |
| | | | trifunctional ~14 | PP-10 | 1.58 | | |
| 4 | Crude MDI | 50.8 | | | | | |
| | Pure MDI | 49.2 | | | | | |
| | Mixture | | difunctional ~70 | Thiodiglycol | 4.73 | 28.0 | 430 |
| | | | trifunctional ~13 | Trimethylolpropane | 0.52 | | |
| 5 | Crude MDI | 33.9 | | | | | |
| | Pure MDI | 66.1 | | | | | |
| | Mixture | | difunctional ~80 | Neopentylglycol | 4.2 | 25.2 | 950 |
| | | | trifunctional ~9 | PP-4 | 6.3 | | |

70 parts of a polyester polyol based on adipic acid, ethylene glycol and 1,4-butanediol with an OH number of 56,
16.8 parts of water,
35 parts of trichlorofluoromethane,
2.8 parts amine catalyst (commercial product Desmorapid ® PV by Bayer AG, Leverkusen),
1.4 parts of triethylenediamine, and age diphenylmethane diisocyanate content of approximately 54 percent by weight and a three functional isocyanate content of approximately 17 percent by weight) and is allowed to foam at 25° C.

The determined cream and rise times were 12 and 80 seconds.

The polyurethane foams had a modest gas yield and unsatisfactory mechanical properties (see Table II).

TABLE II

| Ex. | Comparison Example | Density (g/l) | Tensile Strength (N/mm$^2$) | Elasticity (%) | Strength at Compression 20% | Strength at Compression 40% (N/mm$^2$) | Strength at Compression 60% | Graves Tear Strength (N/mm) |
|---|---|---|---|---|---|---|---|---|
| 6 | | 50 | 0.175 | 115 | 0.537 | 0.8 | 1.5 | 0.8 |
| 7 | | | | | | | | |
| 8 | | 41.5 | 0.135 | 150 | 0.185 | 0.265 | 0.445 | 0.56 |
| 9 | | 30.3 | 0.175 | 120 | 0.475 | 0.659 | 1.15 | 0.56 |
| | I | 33.2 | 0.06 | 75 | 0.13 | 0.18 | 0.3 | 0.25 |
| | II | 33.6 | 0.07 | 80 | 0.15 | 0.25 | 0.39 | 0.3 |

10 parts of a foam stabilizer based on polysiloxane-polyoxyalkylene (Tegostab B 4690) is mixed intensively with
375 parts of the polyisocyanate mixture in accordance with Example 1 at 30° C. and is allowed to foam. The mechanical properties of the resulting foams are summarized in Table II.

EXAMPLE 9

A mixture of
300 parts of a polyether polyol based on dipropylene glycol, propylene oxide, ethylene oxide with an OH number of 29,
11.7 parts of water,
105 parts of dimethylethanolamine,
1.05 parts of triethylenediamine,
1.2 parts of tin dioctoate,
2.1 parts of a foam stabilizer based on polysiloxane-polyoxyalkylene (Tegostab BF 2370 by Goldschmitt AG, Essen), and
30 parts of trichlorofluoromethane is mixed intensively with 230 parts of the polyisocyanate mixture in accordance with Example 1 at temperatures of 30° C. and is subsequently allowed to foam.

The mechanical properties of the resulting foams are summarized in Table II.

COMPARISON EXAMPLE I

To 105 parts of Component A are intensively mixed 56.6 parts of a commercially available mixture consisting of diphenylmethane diisocyanates and polyphenylene polymethylene polyisocyanates (Crude MDI) having a viscosity of 200 centipoises and containing approximately 40 percent by weight of diphenylmethane diisocyanate and a three functional isocyanate content of approximately 20 percent by weight and the mixture is subsequently allowed to foam at 25° C.

The cream time in this case is 15 seconds; the tack-free time is 120 seconds. The resulting polyurethane foam has poor gas yield and poor tear strength. The mechanical properties are listed in Table II.

COMPARISON EXAMPLE II

To 105 parts of Component A are intensively mixed 55.5 parts of a mixture of 77.8 parts of crude MDI containing approximately 40 percent by weight of diphenylmethane diisocyanate and 22.2 parts of 4,4'-diphenylmethane diisocyanate (the mixture has an aver-

COMPARISON EXAMPLE III

To 105 parts of Component A are mixed intensively 54.5 parts of a mixture of 55 parts crude MDI and 44.5 parts 4,4'-diphenylmethane diisocyanate (the mixture has an average diphenylmethane diisocyanate content of approximately 67 percent by weight and a three functional isocyanate content of 11 to 14 percent by weight) and the mixture is allowed to foam at 25° C.

The initially formed foam collapses completely.

COMPARISON EXAMPLE IV

To 105 parts of Component A are mixed intensively 53.6 parts of a mixture consisting of 33.4 parts of crude MDI and 66.6 parts of 4,4'-diphenylmethane diisocyanate (the mixture has an average diphenylmethane diisocyanate content of 80 to 81.5 percent by weight and a three functional isocyanate content of 7 to 8.5 percent by weight) and the mixture is allowed to foam at 25° C.

The foam collapses completely.

COMPARISON EXAMPLE V

To 105 parts of Component A are mixed intensively a mixture consisting of 10 parts of crude MDI and 90 parts of 4,4'-diphenylmethane diisocyanate which was modified with 10 parts of neopentyl glycol (the urethane-modified polyisocyanate mixture had a diphenylmethane diisocyanate content of 95 percent by weight) and the mixture is allowed to foam at 25° C.

The foam collapses.

COMPARISON EXAMPLE VI

According to teachings of British Patent 874,430, a mixture of
97.7 parts of a polyproplene glycol having a molecular weight of approximately 2000,
0.7 parts of dimethylcyclohexylamine,
1 part ethoxylated octylphenol, and
2 parts water
is mixed intensively with 42.3 parts of a mixture consisting of 25 parts of crude MDI and 75 parts of 4,4'-diphenylmethane diisocyanate (the average two functional isocyanate content of the mixture is 85 percent by weight) and the mixture is allowed to foam at 25° C.

The foam collapsed completely and a non-useable powdery mass was obtained.

In contrast to this, foams with good mechanical properties can be produced with the urethane-modified polyisocyanate mixtures according to Examples 1 through 5.

EXAMPLE 10

Polyol Component B:

For Example 10 and Comparison Example VII, the same mixture was used as polyol Component B. This mixture consisted of:

900 parts of a polyether diol based on dipropylene glycol, propylene oxide and ethylene oxide having predominantly primary hydroxyl groups and an OH number of 28, 27 parts of water, 2 parts of Desmorapid PV, 2 parts bis-[beta-(N,N-dimethylaminoethyl)] ether, 2 parts of triethylenediamine, 10 parts of Tegostab B 4690, and 1 part of dibutyltin dilaurate.

To 200 Parts of polyol Component B are intensively mixed 127.3 parts of a prepolymer having an NCO content of 23.7 percent by weight and a viscosity of 680 centipoises at 23° C. The prepolymer has the following composition:

43.2 parts of 4,4'-diphenylmethane diisocyanate, 31.8 parts of crude MDI (the resulting mixture has a two functional isocyanate content of approximately 75 percent), 3 parts of polypropylene glycol having an average molecular weight of approximately 400, 2 parts of neopentyl glycol, and 20 parts of a polyether diol based on dipropylene glycol, propylene oxide and ethylene oxide with predominantly primary hydroxyl groups and an OH number of 28.

The mixture is subsequently allowed to foam. The resulting foam displays good mechanical properties.

COMPARISON EXAMPLE VII

To 200 parts of the polyol Component B are intensively mixed 111.3 parts of a prepolymer having an NCO content of 27.15 percent by weight and a viscosity of 170 centipoises at 23° C. The prepolymer was prepared from the following composition:

43.2 parts 4,4'-diphenylmethane diisocyanate, 31.8 parts crude MDI, and 20 parts of a polyether diol based on dipropylene glycol, propylene oxide and ethylene oxide with predominantly primary OH groups and an OH number of 28.

The mixture is subsequently allowed to foam. The foam totally collapses.

The embodiments of the invention in which an exclusive property or privilege is claimed are defined as follows:

1. A process for the manufacture of flexible polyurethane foams by carrying out a foaming reaction using a reaction mixture comprising organic polyisocyanates, polyols, catalysts, foaming agents and optionally, chain extenders, auxiliaries and additives, wherein the improvement comprises said organic polyisocyanate having NCO contents of 15 to 30 percent by weight and a viscosity of 100 to 2000 centipoises at 20° C. wherein said organic polyisocyanate is a mixture of diphenylmethane diisocyanates and polyphenylene polymethylene polyisocyanates containing 55 to 85 percent by weight of diphenylmethane diisocyanate based on the total weight of the polyisocyanate mixture and wherein said organic polyisocyanate mixture has been reacted with a hydroxyl compound having 2 to 3 Zerewitinoff active hydrogen atoms and a molecular weight of 60 to 1000 in an equivalency ratio of NCO group to active hydrogen atom of said hydroxyl compound of 2:1 to 60:1 prior to the reaction with other said polyols.

2. The process according to claim 1 wherein said organic polyisocyanate is reacted with said hydroxyl compound in an equivalency ratio of NCO group to active hydrogen atoms of said hydroxyl compound of 5:1 to 50:1.

3. The process according to claim 1 wherein said hydroxyl compound has a molecular weight of 120 to 1000.

4. The process according to claim 1 wherein said organic polyisocyanate mixture contains 60 to 70 percent by weight of diphenylmethane diisocyanate based on the total weight of the polyisocyanate mixture.

5. The process according to claim 2 wherein reacted in an equivalency ratio of NCO group to active hydrogen atoms of said hydroxyl compound of 5:1 to 50:1 said organic polyisocyanate has been reacted with said hydroxyl compound in an equivalency ratio of NCO group to active hydrogen atom of said hydroxyl compound of 5:1 to 50:1.

6. The process according to claim 3 wherein said organic polyisocyanate mixture contains 60 to 70 percent by weight of diphenylmethane diisocyanate based on the total weight of the polyisocyanate mixture.

7. The process according to claim 5 wherein said hydroxyl compound has a molecular weight of 120 to 1000.

8. The process according to claim 1, wherein the mixture of diphenylmethane diisocyanates and polyphenylene polymethylene polyisocyanates contains less than 10 percent of 2,4'-diphenylmethane diisocyanate based on the weight of the diphenylmethane diisocyanate.

* * * * *